UNITED STATES PATENT OFFICE.

HENRY BLUMENBERG, JR., OF NEW YORK, N. Y., ASSIGNOR TO WALTON FERGUSON, OF STAMFORD, CONNECTICUT.

STORAGE OR SECONDARY BATTERY.

SPECIFICATION forming part of Letters Patent No. 624,744, dated May 9, 1899.

Application filed August 18, 1898. Serial No. 688,850. (No model.)

*To all whom it may concern:*

Be it known that I, HENRY BLUMENBERG, Jr., a citizen of the United States, residing at Wakefield, in the borough of Bronx, in the city and State of New York, have invented an Improvement in Batteries, of which the following is a specification.

My improvement relates to a battery containing lead and zinc elements or other two elements of opposite polarity, and I make use of an electrolytic solution containing a sulfate of a metal, whereby I prevent the injury heretofore resulting to the elements of the battery by the presence in the electrolytic solution of an uncombined acid radical.

In carrying out my invention I make use of an electrolytic liquid containing bisulfate of potassium, sodium, or ammonium in combination with tersulfate of aluminium, whereby injury to the plates is prevented, because with zinc and lead plates while the battery is discharging a double sulfate of zinc is formed, while in charging the battery the zinc is deposited on the zinc-pole and the lead is peroxidized, the action being the reverse in charging the battery from what it is when the battery is discharging. It will also be understood that the greater the proportion of sulfate-salt in the electrolytic liquid the less will be the resistance of the secondary battery, and the reverse, and I also find that after the water has taken up in solution as much of the tersulfate of aluminium as possible it will also take up a bisulfate of either potassium, sodium, or ammonium, thereby reducing the resistance of the battery and also lessening the risk of injury to the positive or negative elements of the battery.

I claim as my invention—

In a battery containing two elements of different polarity, an electrolytic solution containing tersulfate of aluminium and bisulfate of an alkali or alkaline earth, such as potassium, sodium or ammonium, substantially as specified.

Signed by me this 15th day of August, 1898.

HENRY BLUMENBERG, JR.

Witnesses:
GEO. T. PINCKNEY,
S. T. HAVILAND.